US012678897B2

(12) United States Patent (10) Patent No.: US 12,678,897 B2
Evrat et al. (45) Date of Patent: Jul. 14, 2026

(54) METHOD FOR PRODUCING A BRAZING WIRE AND RESULTING BRAZING WIRE

(71) Applicant: SOBRACORE, Saint Aulaye-Puymangou (FR)

(72) Inventors: Christophe Evrat, Saint Genis Laval (FR); Christophe Mahe, L'isle d'abeau (FR); Jean-Claude Lepine, Riberac (FR); Philippe Schmitt, Besancon (FR)

(73) Assignee: SOBRACORE, Saint Aulaye-Puymangou (FR)

( * ) Notice: Subject to any disclaimer, the term of this patent is extended or adjusted under 35 U.S.C. 154(b) by 660 days.

(21) Appl. No.: 18/018,058

(22) PCT Filed: Jul. 5, 2021

(86) PCT No.: PCT/FR2021/051221
§ 371 (c)(1),
(2) Date: Jan. 26, 2023

(87) PCT Pub. No.: WO2022/029375
PCT Pub. Date: Feb. 10, 2022

(65) Prior Publication Data
US 2023/0256548 A1 Aug. 17, 2023

(30) Foreign Application Priority Data
Aug. 7, 2020 (FR) ...................................... 2008354

(51) Int. Cl.
*B23K 35/40* (2006.01)
*B21C 37/04* (2006.01)
*B23K 35/02* (2006.01)

(52) U.S. Cl.
CPC .......... *B23K 35/406* (2013.01); *B21C 37/045* (2013.01); *B23K 35/0266* (2013.01)

(58) Field of Classification Search
CPC ......... B21B 1/18; B21C 37/045; B21F 5/005; B23K 35/40; B23K 35/406; B23K 2035/408
See application file for complete search history.

(56) References Cited

U.S. PATENT DOCUMENTS 4,048,705 A 9/1977 Blanpain et al.
4,203,188 A 5/1980 Blanpain et al.
(Continued)

FOREIGN PATENT DOCUMENTS

EP 1663543 A1 6/2006
EP 2735398 A1 5/2014
(Continued)

OTHER PUBLICATIONS

Search Report and Written Opinion issued in International Application No. PCT/FR2021/051221, dated Oct. 14, 2021.

*Primary Examiner* — Christopher J. Besler
(74) *Attorney, Agent, or Firm* — MARSHALL, GERSTEIN & BORUN LLP

(57) ABSTRACT
A method for producing a brazing wire consists of unwinding a solid metal or metal alloy wire, of circular or substantially circular cross-section and subjecting the wire to a stamping operation between rotating rollers, the periphery of which respectively having a die for receiving the full wire and a punch capable of deforming the wire and of generating a U-shaped cross-section across substantially the entire original diameter of the wire. The method also consists of filling the volume defined by the U using brazing flux or pickling flux in a powder or paste form and closing the arms of the U, after filling of the volume with the flux, one on top of the other with the end of one of the arms of the U overlapping the other. The method also consists of calibrating and shaping the resulting wire, according to the desired diameter and cross-section.

6 Claims, 1 Drawing Sheet

(56)                    References Cited

U.S. PATENT DOCUMENTS

| | | | | |
|---|---|---|---|---|
| 4,587,726 | A * | 5/1986 | Holmgren ............ | B23K 35/406 |
| | | | | 174/102 P |
| 2002/0040572 | A1 | 4/2002 | Adrian | |
| 2006/0261054 | A1* | 11/2006 | Katiyar .................. | B23K 35/40 |
| | | | | 219/145.22 |
| 2012/0006881 | A1 | 1/2012 | Fuerstenau | |
| 2016/0067833 | A1* | 3/2016 | Campbell .............. | B23K 35/40 |
| | | | | 72/46 |

FOREIGN PATENT DOCUMENTS

| | | | |
|---|---|---|---|
| EP | 2905105 | A1 | 8/2015 |
| FR | 2859122 | A1 | 3/2005 |
| FR | 2974528 | A1 | 11/2012 |
| WO | WO-2019057335 | A2 | 3/2019 |

\* cited by examiner

[Fig 1]
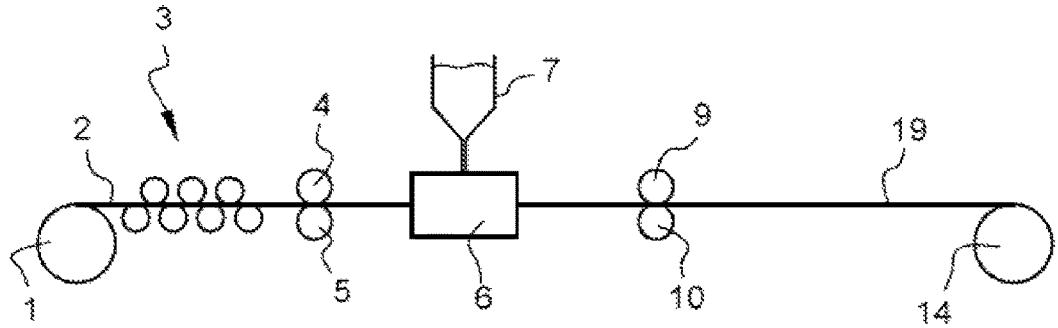
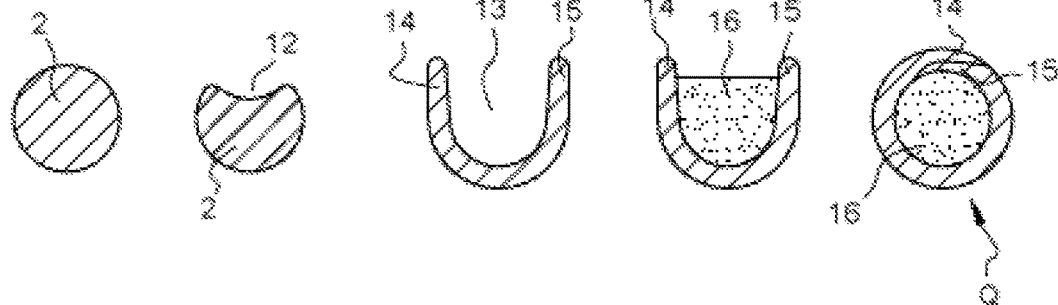
Fig. 2a Fig. 2b Fig. 2c Fig. 2d Fig. 2e
[Fig 3]
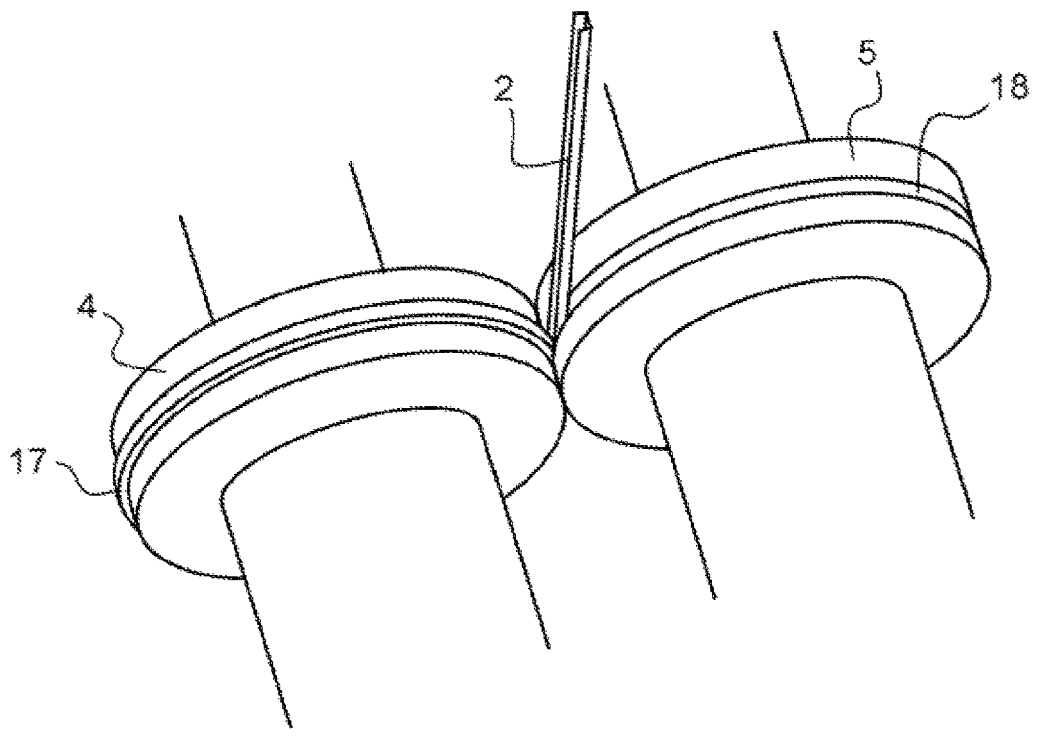

METHOD FOR PRODUCING A BRAZING WIRE AND RESULTING BRAZING WIRE

TECHNOLOGICAL FIELD

The invention pertains to the field of brazing, that is, a technique now widely mastered, enabling to assemble metal elements together by implementing a filler metal, having a melting temperature lower than the melting temperature of said metal elements to be assembled.

BACKGROUND

In known fashion, brazings appear in the form of wires, of sticks, or also of rings, integrating or not a pickling flux. When the brazing temperature is higher than the melting temperature of the metal or of the alloy forming it (typically based on aluminum or on an aluminum silicon alloy, or even based on silver), the metal or the metal alloy melts, and spreads by capillarity at the level of the surfaces to be assembled to form a joint.

Conventionally, a brazing flux, also called pickling flux, is applied at the level of the surfaces to be assembled by brazing, having the function of, first, removing the oxide layers conventionally present at the level of the metal surfaces to be assembled, but also of promoting the displacement of the molten metal or metal alloy forming the brazing, and finally, of avoiding the subsequent forming of oxide at the level of the metal surfaces fastened together. Typically, this pickling flux is formed based on complexes of potassium fluoroaluminate, of cesium, of potassium fluoroborate, or of any chemical substance having the purpose of decreasing surface tensions.

When brazings with a pickling, that is, integrating a brazing flux, appear in wire form, and whatever the method implemented to manufacture such a brazing, a first step consists of forming a primary wire, metallic or made of a metal alloy, which is then drawn to shape it to the desired diameter. This primary wire is then filled with a powder or paste brazing flux, to form the actual brazing.

Among the different techniques implemented to generate the primary wire, that is, the wire, metallic or based on a metal alloy, intended to be taken to a temperature higher than its melting temperature to ensure the subsequent joint, that consisting of using a band, which is deformed to be given a U shape, within which the powder or paste flux is deposited, is particularly known. The upper arms of the U are then taken closer to each other, so that they overlap or that they meet at the level of their free ends, so as to obtain a cored wire, shaped to the desired diameter by wire drawing operations. Such a method has for example been described in document US 2012/006881. While this method enables to obtain a brazing of good quality, however, it requires the implementation of a band having a controlled thickness and width to obtain the desired diameter with a controlled overlapping of the ends of the arms of the U, requiring a previous lamination step, significantly increasing the production cost of the final product.

Incidentally, experience proves that, with such a method, the final thickness of the wall of metal or metal alloy constitutive of the wire is not constant, which may result in a non-isotropic spreading by capillarity of said metal or of said metal alloy when it is molten, affecting the quality of the joint or of the brazing.

SUMMARY OF THE DISCLOSURE

The present invention first aims at manufacturing a cored wire having a much greater usable wire length than wires existing on the market, and all this in a single operation. It also enables to better control the content of pickling flux in the cored brazing resulting from this new method. It requires a less processed raw material, more abundant on the market.

Second, it aims at generating a cored brazing wire, having a nearly constant thickness of its wall of metal or of metal alloy, to achieve an isotropic displacement of said metal or of said metal alloy after melting and, accordingly, to optimize the quality of the actual brazing.

For this purpose, the invention provides such a method for the forming of a brazing wire, which consists:

first, of unwinding a solid metal or metal alloy wire, of circular or substantially circular cross-section;

of subjecting said wire to a stamping operation between rotating rollers, the periphery of said rollers respectively having a die for receiving said solid wire and a punch capable of deforming the wire and of generating a U-shaped cross-section of the wire across substantially the entire original diameter of said wire;

of filling the volume defined by the U with a brazing flux or pickling flux in powder or paste form;

of closing the arms of the U, after filling with the brazing flux or with the pickling flux, one on top of the other with the end of one of the arms of the U overlapping the other;

of calibrating and of shaping the resulting wire now filled with the brazing flux or with the pickling flux, according to the desired diameter and cross-section (circular, oval, triangular, square, rectangular, etc.).

In other words, the invention consists, first, of using as a basic material of the brazing wire, a solid metal or metal alloy wire, directly obtained from the units for manufacturing such wires, and thus with a decreased production cost. This solid wire undergoes a stamping step to then define a wire of U-shaped cross-section, said U being formed across the entire diameter of said wire.

The invention thus does away with a step of lamination, or of forming of a calibrated band, and generally with any prior operation of shaping of a raw out-of-the-die wire.

It is specified that the stamping step may be carried out at room temperature, or at a controlled (higher) temperature, according to the nature of the alloy forming the wire.

According to an advantageous feature of the invention, the method implements, between the step of unwinding of the solid wire and the stamping step, a step of rectification of said wire, it being indeed reminded that the raw wire used as a basic material for the forming of the brazing wire is stored on reels or coils. This rectification step aims at then having a perfectly rectilinear wire, capable of favoring the subsequent stamping step on the one hand, and above all of filling with brazing flux or with pickling flux on the other hand.

According to an advantageous feature of the invention, the stamping of the metal or metal alloy wire is performed so as to define a differentiated deformation of said wire between the center or middle of the wire and the end of the arms of the U, to be able to have, during the step of closing of the arms of the U on each other, a constant or substantially constant thickness of the metal or metal alloy wall of the cored brazing wire.

According to another advantageous feature, after stamping of the U-shaped metal or metal alloy wire, the wire undergoes by means of a die a prior shaping operation before its filling, intended to adjust as correctly as possible the dimensions of the U according to the diameter of the cored wire which is desired to be obtained.

The filling with pickling flux of the U-shaped wire may be performed by running of said wire through a reservoir of flux then stored in powder or paste form, submitted or not to vibration, and then shaving at the level of the end of the U or slightly beyond the upper end of the U.

Finally, according to still another feature of the invention, the filling of the U-shaped wire is controlled by means of a camera or any equivalent means measuring the effective height of the flux in the U-shaped metal cavity.

The invention also aims at the brazing wire obtained by this method. This brazing wire is cored by means of a brazing flux or of a pickling flux, the thickness of the metal or metal alloy wall of said wire being constant or substantially constant.

BRIEF DESCRIPTION OF THE DRAWINGS

The way in which the invention may be implemented and the resulting advantages will better appear from the following non-limiting embodiments, in relation with the accompanying drawings.

FIG. 1 is a simplified representation of an installation implementing the method according to the invention.

FIGS. 2A-2E are simplified representations illustrating the variation of the cross-section of the metal or metal alloy wire during the method of the invention.

FIG. 3 is a simplified perspective representation of the operation of stamping of the solid wire, to give it a U shape.

DETAILED DESCRIPTION

As already indicated, FIG. 1 shows a simplified illustration of the different steps of the method of the invention.

The brazing wire of the invention comprises as a basic material a solid metal wire (2), that is, of circular cross-section, as illustrated in FIG. 2A. This wire is typically formed based on silver, on copper, on zinc, on aluminum, or on an alloy of these metals. It is stored in the form of a coil (1), said coil being mounted on a reel. Said wire (2) then undergoes a rectifying operation, by running through a succession of rollers (3) of planar peripheral surface, to obtain a perfectly rectilinear wire.

According to the invention, the wire, still solid at this stage, undergoes an operation of stamping between rotating rollers (4, 5). As can be observed in FIG. 3, the periphery of these rollers respectively exhibits a hole or die (18) for receiving the solid wire and thus of dimension adapted to the initial diameter of said wire (2), to forbid the displacement of said wire during the stamping operation, and a punch (17), that is, a protrusion, of appropriate dimension, positioned in front of the die, so as to generate a deformation of the wire (2), and particularly to generate a U-shaped cross-section across substantially the entire diameter of the wire, such as shown in FIG. 2B (initiation of the beginning of the deformation (12)) and FIG. 2C (end of the deformation: U-shaped cross-section).

Although in the described example, and also illustrated in FIG. 1, only two stamping rollers (4, 5) have been shown, it should be specified that those skilled in the art will be capable of adapting the number of these rollers, typically 4, 6, or even 8, according to the nature and to the characteristics of the alloy forming the wire to be transformed.

As it can in particular be observed in FIG. 2C, this stamping generates not only the deformation of the U-shaped wire, defining a volume (13) intended, during a subsequent step, to be filled with a pickling flux (16), but further a thinning of the upper ends (14, 15) of the U, the purpose of which will be described hereafter.

Advantageously, once the film has been given a U shape, it is run through a calibration die, especially machined to perfectly adjust the dimensions of the U according to the diameter of the final cored brazing wire (19) which is desired to be obtained.

During a subsequent step, the U-shape wire is then filled with a brazing pickling flux in powder or paste form.

Typically, this pickling flux is formed of a chemical substance capable of decreasing surface tensions, and for example formed based on potassium fluoroaluminate, on cesium, on potassium fluoroborate, without for this list to be limiting in any way.

The filling of the U-shaped wire may be performed in different ways, and for example by running of the wire through a reservoir (6) filled with the powder or paste flux, from a storage reservoir (7). The reservoir (6) is vibrated or not by any appropriate means according to a frequency and an amplitude which depends on the alloy used and on the type of flux, to optimize the filling of the volume (13) with pickling flux. Thus, said reservoir (6) may be connected or not to a generator of vibrations, having their frequency and their amplitude selected according to the metal alloy/flux pair, to optimize the filling of the volume (13).

A shaving system enables to adjust the quantity of flux according to the specifications. This system may be formed of a scraper, that is, of a rectilinear blade of adjustable height, or of a pressing wheel.

Advantageously, the installation implementing the method of the invention comprises means for controlling the filling of said volume (13) formed of a camera or the like, which measures the height, and thus accordingly the quantity of pickling flux in the volume (13). This control means enables to ensure that the flux level is effectively within tolerances. If not, the installation is automatically stopped and the operator notified. Under this last assumption, the operator visually observes the defect, and then manually corrects the quantity of flux. Then, they restart the production.

The cored metal or metal alloy wire (19) such as illustrated in FIG. 2D is then obtained.

The wire thus filled then undergoes a closing step, obtained by drawing together the free ends of the arms (14, 15) of the U and closing of said arms on each other (FIG. 2E) by means of two rollers (9, 10) of appropriate shape allowing the shifting of the ends, that is, the shifting of a lip or free end of the arms with respect to the other lip (the free end of the second arm), to allow an overlapping of one on the other.

The obtained wire (19) is then drawn and then wound (11) for storage and delivery purposes.

Thus, the set of operations which comprises passing from a solid brazing wire to a cored brazing wire is performed on one and the same installation, within a relatively short time period, allowing an optimization of the process.

Advantageously, and as can in particular be observed in FIG. 2D, the free ends (14, 15) of the arms of the U are thinned, to allow, on folding of one of said ends on the other, to have a substantially constant thickness of the external brazing wire, and accordingly, to achieve a substantially isotropic spreading of the metal or of the metal alloy which forms it during its melting, and thus the forming of a more efficient joint between the two metal parts to be assembled.

One can thus fully understand the advantage of the present invention which enables, by means of a relatively simple installation, to form brazing wires in accordance with the required qualities to achieve a brazing operation of good quality, a continuous wire length much greater than current processes, and better-controlled quality parameters with a much lower production cost than prior art brazing wires, and due further to the isotropic displacement of the metallic material or of the metal alloy forming the basic wire and according to satisfactory economic conditions.

The invention claimed is:

1. A method for formation of a brazing wire, comprising:

first, unwinding a solid metal or metal alloy wire, of circular cross-section;

subjecting said wire to a stamping operation between rotating rollers, a periphery of said rollers respectively having a die for receiving said wire and a punch capable of deforming the wire and of generating a U-shaped cross-section of said wire across an entire original diameter of said wire;

filling a volume defined by the U-shaped cross-section by means of a brazing flux or pickling flux in powder or paste form;

closing arms of the U-shaped cross-section, after the step of filling of the volume with the brazing flux or with the pickling flux, such that a first arm of the arms of the U-shaped cross-section is disposed on top of a second arm of the arms of the U-shaped cross-section with an end of the first arm overlapping an end of the second arm;

calibrating and of conforming the wire now filled with the brazing flux or with the pickling flux, according to a desired diameter and cross-section, wherein the stamping of the metal or metal alloy wire is performed so as to define a differentiated deformation of said wire between a center or middle of the wire and the ends of the first and second arms of the U-shaped cross-section, so as to define a cored brazing wire having an outer metal or metal alloy wall having a constant thickness.

2. A method for the forming of a brazing wire according to claim 1, wherein, between the step of unwinding of the solid wire and the stamping operation, a rectifying step is performed so as to obtain a perfectly linear wire.

3. A method for the forming of a brazing wire according to claim 1, wherein, after the stamping operation, the wire undergoes by means of a second die a shaping operation before the step of filling, intended to adjust a dimension of the U-shaped cross-section according to the desired diameter.

4. A method for the forming of a brazing wire according to claim 1, wherein the filling of the volume with a brazing flux or pickling flux is performed by running of said wire through a reservoir of the brazing flux or the pickling flux in the power or paste form, and then shaving at a level at an end of the wire.

5. A method for the forming of a brazing wire according to claim 4, wherein the reservoir is subjected to vibrations.

6. A method for the forming of a brazing wire according to claim 1, wherein the filling of the volume by the brazing flux or pickling flux is controlled by means of a camera or any equivalent means measuring an effective height of the brazing flux or pickling flux in the volume.

* * * * *